3,563,761
LACTALBUMIN PHOSPHATE AS PROTEIN INGREDIENT IN NON-BUTTERFAT DAIRY PRODUCTS
Rudolph H. Ellinger, New Canaan, Conn., assignor to Stauffer Chemical Company, New York, N.Y., a corporation of Delaware
No Drawing. Continuation-in-part of application Ser. No. 605,974, Oct. 30, 1966. This application Sept. 19, 1969, Ser. No. 859,588
Int. Cl. A23c 11/00
U.S. Cl. 99—63
12 Claims

ABSTRACT OF THE DISCLOSURE

A prepared non-butterfat dairy product containing undenatured lactalbumin phosphate. Undenatured lactalbumin phosphate has been found to serve as a replacement for sodium caseinate in non-butterfat dairy product compositions. This replacement has been found to serve functionally in every respect and as a nutrient having a value equal or superior to that of sodium caseinate. Particular areas of applicability include coffee whiteners, whipped toppings, mellorines, imitation sour creams, imitation cream cheese, snack dips, baby formulas and instant breakfasts.

CROSS REFERENCE TO RELATED APPLICATION

This application is a continuation-in-part of applicant's co-pending application Ser. No. 605,974, filed Dec. 30, 1966 now abandoned.

BACKGROUND OF THE INVENTION

This invention relates to non-butterfat dairy product food compositions containing as a partial or total replacement for sodium caseinate undenatured lactalbumin phosphate.

The precipitation of soluble proteins, such as albumin, with certain condensed phosphates has long been known. This action occurs only in acid media and has been the subject of considerable study, see, e.g., B. Katchman et al., Biochim. et Biophys. A.C.T.A., 14, 445 (1954). Although there is some evidence that this precipitation may involve chemical reaction, it is presently thought to be mainly one of cation-anion interaction. At pH values below their isoelectric point, proteins act as high molecular weight cationic electrolytes, the over-all charge of which depends on the exact pH. The higher the molecular weight of the given water-soluble protein, the less of a given phosphate is needed to give a precipitate, and conversely, the higher the molecular weight of the phosphate, the less of a given protein is needed (Katchman et al., ibid.). It is also known that the soluble protein in milk, contained in the milk whey, may be precipitated with long chain phosphates after removal of colloidally dispersed solids (casein). About one-fourth of all of the proteins contained in milk are solubilized in the whey. The casein may be precipitated from milk by acidification to pH 4.6, by salt precipitation, or by the action of rennet.

The precipitation of the casein from the milk changes the chemical nature of the purified casein or precipitated vis-a-vis the casein present in whole milk. Whole milk and also the dried forms thereof including non-fat dried milk are known to exist or provide micellular structures built from sub units which consist of linear, random-thread, $\beta$-casein polymer, to which $\alpha_S$-casein is attached by lyophobic forces. K-casein associates with some of the $\alpha_S$-casein and the complex is stabilized against reversible dissociation by colloidal calcium phosphate linkages. Also included within the micelle are other casein forms such as $\gamma$-casein. Precipitation of the casein destroys the micellular structure. (A Proposed Model of Micelle Structure in Bovine Milk, Dyson Rose, Dairy Sci. Abstr. 31(4) 171–75, 1969.) Addition of water to precipitated casein will not reconstitute milk micelles as will the addition of water to a dried milk product such as non-fat dried milk. Food grade caseins are not the same as the caseins as contained in milk inasmuch as fractions of the casein such as $\gamma$ casein are lost in the purification process. Other ions such as phosphates, calcium, and the like are also lost in this purification process.

The lactalbumin phosphate contained in the improved food compositions of the instant invention has the major proportion of its protein moiety in substantially undenatured water-soluble form. In this regard, it is important to note that a common problem in milk processing is denaturation of the protein. Heat denaturation is most common. The principal results of heat denaturation on whey proteins are a decreased solubility of the proteins in both acid and salt solutions and an increased activity of sulfhydryl groups, see Jenness, R., Effects of Heat Treatment on Serum Proteins, J. Agr. Food Chem. 75, 1954. Whey proteins are presently thought to be a mixture of $\alpha$-lactalbumin, and $\beta$-lactoglobulin, Advances in Food Research, vol. 10, 1960, pp. 45–49. Mean values for whole liquid cow milk has been found to contain from about 0.4 to about 0.5 percent by weight lactalbumin (mean value) and from about 0.11 to about 0.26 percent $\beta$-lactoglobulin. In whey these proteins are believed to be present in a ratio of from about 2:1 to about 10:1 lactalbumin to $\beta$-lactoglobulin. The effect of heat on $\beta$-lactoglobulin is perhaps most pronounced. Changes in whey protein, caused by heat denaturation, have limited its utility in food applications heretofore. The lactalbumin phosphate of the present invention, which contains its protein in an undenatured form, is not so limited and is useful in many applications where denatured protein is unsuitable.

The recovery of protein from whey as phosphate includes both lactalbumin and lactoglobulin. The term lactalbuminphosphate as used herein is intended to include both the lactalbumin and $\beta$-lactoglobulin. These components are not generally separated in their recovery.

In U.S. Pat. 3,269,843, issued Aug. 30, 1966 to McKee and Tucker it is proposed to utilize LAP as a replacement for non-fat dry milk in baking compositions and comminuted meat products.

It has now been found that undernatured LAP serves effectively as a replacement for sodium caseinate, on an equal basis. Sodium caseinate, formed by the alkali neutralization of casein, has found broad utility in non-butterfat dairy products. Sodium caseinate is conventionally used in such food compositions as coffee whiteners, whipped toppings, mellorines, frozen deserts, puddings, custards, frozen cream pies, process cheese, imitation sour cream, snack dips, baby foods, "instant" breakfasts and the like. While sodium caseinate generally serves a specific function in these compositions it simultaneously serves as a nutrient additive. Lactalbumin phosphate can effectively replace and is a functional equivalent for sodium caseinate in all such food compositions. By the term functional equivalent it is intended to include physical and chemical as well as nutrient functions. The importance of this discovery is enhanced by the fact that the availability of whole milk and whole milk products such as casein is dwindling with increasing population, and that lactalbumin phosphate is recovered in large measure from whey which has in most instances in the past been discarded as waste, limited amounts being used in animal feeds. More recently dried whey has been proposed as a food additive but because of the denaturation of the protein inherent in the process of spray drying and the large amounts of lactose present, it makes application difficult and requires extensive reformulation. Lactose present in dry whey up to 75% has a pronounced effect on food compositions utilizing it.

It is therefore believed quite surprising, in accordance with this invention, to find that lactalbumin phosphate serves as a replacement for sodium caseinate in non-butterfat dairy food compositions normally using sodium caseinate on an equal requirements basis, totally or partially. The finding of the present invention is also equally surprising in view of the prior art wherein undenatured lactalbumin phosphate has been taught to be utilized as a substitute for a micelle forming composition of non-fat dried milk in contradistinction to the pure chemical compound of sodium caseinate which does not form micelles and which is of a chemical structure different from the chemical composition of non-fat dried milk.

The amount of lactalbumin phosphate used in any of the compositions above will vary with the amount of sodium caseinate normally used in such compositions, and whether or not the sodium caseinate is partially or wholly replaced by lactalbumin phosphate. For any given composition, however, the lactalbumin phosphate replaces sodium caseinate on a weight for weight basis. Sodium caseinate is normally used in food compositions in an amount of from about 0.5 to about 20%, although higher amounts can be used if desired.

Lactalbumin phosphate can be used with sodium caseinate in these food compositions in a ratio of from about 0.1 to about 100 parts by weight lactalbumin phosphate to about from 99.9 to about 0 parts of sodium caseinate.

Sodium caseinate serves one or more function in the various food compositions containing it. For example, in compositions containing fat or oil and water this ingredient serves to encapsulate the oil droplets and bind water thus stabilizing the composition and preventing separation of oil and water from the food composition. In compositions where air is blended or beaten into the mixture, sodium caseinate serves to further bind the air bubbles to the encapsulated oil or fat and water and thus stabilizing the foam, i.e., the air, water fat system. It similarly serves to prevent or inhibit churning in certain applications.

It has been further found that in addition to replacing sodium caseinate in such food compositions, per function, lactalbumin phosphate provides to the food composition equal or superior nutritive values based on essential amino acid compositions. This can be seen from Table I, following, wherein the approximate respective constituent amino acids of casein, sodium caseinate, lactalbumin and lactoglobulin are set forth.

potassium metaphosphate is used, it is preferable to first react the metaphosphate in solution with a sodium salt such as sodium sulfate, sodium chloride, sodium pyrophosphate, sodium hexametaphosphate (short chain) etc., to improve solubility. Mixtures of sodium and potassium glassy metaphosphates are also suitable for precipitating lactalbumin phosphate. The preparation of undenatured protein metaphosphates by reaction between an alkali metaphosphate and soluble protein is described in an article by Briggs, David R., The Journal of Biological Chemistry, vol. 134, June 1940, pp. 261–272. After treatment of the whey protein with a glassy metaphosphate by the preferred process of the present invention, the whey is centrifuged to collect a heavy gumlike coagulum of lactalbumin phosphate which is then dried. To prevent denaturation of the protein, the whey temperature is normally maintained below 180° F., preferably below about 160° F. For the same reason, it is preferable to dry the coagulum by spray-drying at low temperatures, although other types of driers, such as drum driers, rotary driers, etc., are also suitable. Recovery of the soluble proteins from the whey is essentially quantitative, with only minor processing losses. The following specific example will further illustrate the preparation of undenatured lactalbumin phosphate.

EXAMPLE I

To 1400 pounds of bovine whey at 140–180° F. is added 80 pounds of a 10% solution of eight parts sodium metaphosphate and one part potassium metaphosphate. The treated whey is then passed into a De Laval-type centrifuge where a heavy, gum-like coagulum is recovered. The coagulum is then spray-dried and recovered as a white particulate product.

In general, the characteristics and properties of the lactalbumin phosphate produced according to the aforesaid procedure will be somewhat dependent upon processing conditions (temperature, etc.), the pH of the whey, and the chain length of the glassy metaphosphate starting material. As normally produced, the product contains between 40% and 70% protein and between about 15% and 25% phosphate. A preferred lactalbumin phosphate for food applications contains between about 50 and 60% protein. Also, the lactalbumin phosphate will range in pH from about 5 to 7, while a preferred product has a pH of about 6.0. We will now more specifically illustrate the application of undenatured lactalbumin phosphates in various food products.

For purposes of the present invention non-butterfat dairy products are those products containing animal fat or vegetable fats or oils other than derived from milk or cream, i.e., butterfat. Included with the said fats and oils are the "emulsifiers," i.e., mono and diglycerides (fats

TABLE I [1]

| | Arginine | Histidine | Isoleucine | Leucine | Lysine | Methionine | Phenylalanine | Threonine | Valine | Tryptophane | Tyrosine |
|---|---|---|---|---|---|---|---|---|---|---|---|
| Casein | 4.1 | 3.02 | 6.6 | 10.55 | 8.60 | 3.17 | 5.72 | 4.47 | 8.24 | 1.17 | 5.63 |
| Sodium caseinate [2] | 2.67 | 1.96 | 4.3 | 6.86 | 6.2 | 2.06 | 3.71 | 2.9 | 5.36 | 0.76 | 3.65 |
| Milk lactalbumin | 4.0 | 2.3 | 7.5 | 12.1 | 10.5 | 2.6 | 5.0 | 6.0 | 6.6 | 2.5 | 5.3 |
| Milk lactoglobulin | 2.9 | 1.6 | 6.8 | 15.5 | 11.3 | 3.2 | 3.7 | 5.3 | 5.8 | 1.9 | 3.7 |
| Lactalbumin phosphate [3] | 2.16 | 1.26 | 4.38 | 7.92 | 6.42 | 1.68 | 3.48 | 3.48 | 3.78 | 1.38 | 2.88 |

[1] Units in percent, protein basis.
[2] Estimate based on 65% value of casein.
[3] Estimate based on 60% value of combined lactalbumin and lactoglobulin.

The lactalbumin phosphate of the instant application may be succinctly defined as the product produced by "reacting" long chain polyphosphates with liquid whey and drying the resulting precipitate without denaturation of the protein. Suitable long chain polyphosphates are the glassy sodium and potassium metaphosphates of the formulas $(NaPO_3)_x$ and $(KPO_3)_x$, respectively, having an average chain length (represented by $x$) of at least 30. These straight chain inorganic polymers, which are sometimes known as hexametaphosphates, are to be distinguished from the cyclic or ring metaphosphates. Where and oils being triglycerides). These products contain the vegetable or nonbutterfat animal fat as substitutes or replacement for butterfat normally found in such compositions. It is common for such products to also contain sodium caseinate as a replacement for all or a portion of the protein.

Coffee whiteners

Coffee whiteners have been on the market for several years and have proven to be an effective substitute for whole milk and cream in coffee. Two types of coffee whiteners have been marketed: the dry and liquid form. These products have the advantage that they are less expensive than the corresponding natural dairy product. The dry form is particularly advantageous in that it requires no refrigeration, and reduces risk of spoilage. For these reasons, coffee whiteners have received a popular reception in such market areas as offices, and picnic and company supplies where refrigeration is not available or where risk of spillage is a problem. Sodium caseinate is commonly used in coffee whiteners to encapsulate the fat or oil droplets, thus preventing separation of the fat and coalescence of the droplets to form fat lakes on the surface of hot coffee. As is well known cream often separates on the surface of hot coffee forming globules of butterfat. Thus, when properly formulated and manufactured, coffee whiteners are often superior in stability to cream.

Sodium caseinate is generally used in dry coffee whiteners in amounts of from about 5 to about 10 percent based on the total composition.

Set forth below are typical coffee whitener formulations with a range of ingredients given for each. One of these formulations is for a liquid type coffee whitener, the other for a dry type.

In the example below, the control formulation is a typical formula for coffee whiteners containing sodium caseinate.

Coffee whiteners, liquid

Ingredients: Percent (range)
Sodium Caseinate (or LAP) _____ 0.5–5.0
Corn syrup solids _____ 7.5–15.0
Vegetable shortening _____ 7.5–15.0
Dipotassium phosphate _____ 0.5–1.5
Stabilizer gums and emulsifiers _____ 0–5.0
Flavoring _____ As needed
Water to bring to 100%.

Coffee whiteners, dry

Ingredients: Percent (range)
Sodium Caseinate (or LAP) _____ 5.0–10.0
Vegetable shortening _____ 35.0–50.0
Corn syrup solids _____ 35.0–50.0
Emulsifiers _____ 0–5.0
Dipotassium phosphate _____ 0.5–3.0
Flavoring _____ As needed In the foregoing formulations lactalbumin phosphate can be used to replace the sodium caseinate in whole or in part.

Two typical type formulations for coffee whiteners utilizing lactalbumin phosphate are set forth below:

Lactalbumin phosphate replacement of sodium caseinate

Coffee whitener (liquid)

Ingredient: Percent
Lactalbumin phosphate (LAP) _____ 2.00
Corn syrup solids _____ 10.00
Dipotassium phosphate _____ 1.07
Vegetable shortening _____ 10.00
Stabilizer and emulsifier _____ 0.40
Water _____ Balance Coffee Whitener (dry)

Ingredient:
LAP _____ 8.00
Hydrogenated vegetable shortening _____ 44.20
Corn syrup solids _____ 43.60
Mono and diglycerides _____ 3.00
Dipotassium phosphate _____ 1.00
Flavoring _____ 0.20

In the examples which follow and throughout this specification all parts and percentages given are by weight unless otherwise specified. Additionally the following terms have the following meaning throughout:

Corn syrup solids—24 DE—Powdered maltodextrin produced by spray drying low concentration corn syrup.

The numeral letter designation refers to a 24 dextrose equivalent.

Carageenin is a gum extracted from red seaweed (Irish moss).

Emulsifier—In each instance the emulsifier used was a mixture of mono- and di-glycerides of the fat acids containing approximately 40% monoglyceride.

Vegetable shortening—Hydrogenated vegetable oil.

EXAMPLE 2

In a comparison study of lactalbumin phosphate in liquid coffee whitener compositions, a control formulation containing sodium caseinate and a test formulation containing no sodium caseinate but an equal replacement of lactalbumin phosphate were prepared. These formulations had the following compositions:

| | Ounces | Percent |
|---|---|---|
| 1. Control formulation, Ingredients: | | |
| Sodium caseinate | 3.00 | 2.00 |
| Corn syrup solids—24 DE | 15.00 | 10.00 |
| Dipotassium phosphate, $K_2HPO_4$ | 1.20 | 0.80 |
| Vegetable shortening | 15.00 | 10.00 |
| Carageenin | 0.23 | 0.15 |
| Emulsifier | 115.42 | 76.95 |
| Total | 150.00 | 100.00 |
| 2. Test formulation, ingredients: | | |
| Lactalbumin phosphate | 3.00 | 2.00 |
| Corn syrup solids—24 DE | 15.00 | 10.00 |
| Dipotassium phosphate | 1.60 | 1.07 |
| Vegetable shortening | 15.00 | 10.00 |
| Carageenin | 0.23 | 0.15 |
| Emulsifier | 0.15 | 0.10 |
| Water | 115.02 | 76.68 |
| Total | 150.00 | 100.00 |

[1] Dipotassium phosphate added in an amount necessary to adjust the pH of the test formulation to that of the control i.e., pH.

Both the control and the test formulations were prepared as follows:

(1) The sodium caseinate or lactalbumin phosphate ingredient was blended with the corn syrup solids, and carageenin.

(2) The dipotassium phosphate buffer was dissolved in the water.

(3) The blended dry ingredients were slowly added with mixing sufficient to thoroughly disperse them in the water.

(4) The shortening was added.

(5) The mixture was heated with constant rapid stirring in a steam jacketed kettle to 160° F.

(6) The emulsifier was added and permitted to melt.

(7) The solution was then homogenized at a temperature of 160° F. in a two stage homogenizer at 2500/500 p.s.i.

(8) The homogenized was cooled to a temperature of 35° to 40° F. and thereafter permitted to "age" overnight at refrigerator temperatures before evaluation (approximately 40° C.).

Evaluation (1) Control with sodium caseinate was normal in all characteristics: No separation of the emulsion occurred during overnight aging. The viscosity, as measured on a Brookfield model HAF viscometer Spindle No. 1 at 10 r.p.m., was about 70 cps. No fat droplets appeared when added to coffee at 180° F.

(2) Test formulation: No separation of the emulsion occurred during the overnight aging. The viscosity of the samples were 72 cps. and 124 cps. respectively. Organoleptically the differences in viscosity were not readily apparent. No fat droplets appeared in the test samples when added to hot coffee. No differences in color or flavor of coffee was noted when the lactalbumin phosphate containing samples were compared to the sodium caseinate controls.

The test formulation above was repeated except that the lactalbumin phosphate ingredient was replaced by a mixture of 75% sodium caseinate and 25% lactalbumin phosphate in the same amount. The formulation was evaluated in a similar manner and no difference was detected.

Whipped topping bases

Whipped toppings for desserts have been utilized in commercial bakeries for some time; it was not, however, until the advent of the commercial aerosol can that these toppings attained widespread home use. Sodium caseinate is conventionally utilized in the preparation of the whipped topping bases utilized in both the commercial toppings, liquid and dry as well as the aerosol can type. These toppings are another example of non-butterfat dairy products made without sacrifice of flavor or aesthetic appearance, in a potential per capita availability greater than natural butterfat containing commodities. Within the provisions of this invention it has been found that the sodium caseinate can be replaced totally or partially replaced in whipped topping bases to provide equal or superior results. Sodium caseinate is utilized to fulfill the same function here as in coffee whiteners, i.e. to bind water and encapsulate the oil or fat droplets thereby stabilizing the emulsion and stabilizing the foam eventually produced. Sodium caseinate is normally used in these compositions in an amount of from about 5% to about 10% by weight.

Representative formulations of both liquid and dry whipped topping bases are set forth below showing relative ranges of ingredients:

Whipped toppings, liquid

Ingredients: Percent (range)
Sodium caseinate (or LAP) _____ 0.5–5.0
Sugar _____ 0–15.0
Corn syrup solids _____ 0–15.0
Vegetable shortening _____ 20.0–40.0
Stabilizer gums and emulsifiers _____ 0.2–5.0
Flavor and color _____ As needed
Water to bring to 100%.

Whipped toppings, dry

Ingredients: Percent (range)
Sodium caseinate or lactalbumin phosphate _____ 3.0–10.0
Vegetable shortening _____ 50.0–70.0
Sugar _____ 0–20.0
Corn syrup solids _____ 0–25.0
Stabilizers, emulsifiers, buffers, flavor, color _____ 0–15.0

Lactalbumin phosphate can be used to replace sodium caseinate totally or in part in these formulations.

A typical specific formulation of a whipped topping for both liquid and dry base utilizing lactalbumin phosphate is set forth below:

Whipped topping (dry)

Ingredient: Percent
Lactalbumin phosphate _____ 5.00
Vegetable shortening _____ 60.00
Mono and diglyceride emulsifiers _____ 9.50
Corn syrup solids _____ 10.50
Sugar _____ 14.55
Stabilizer _____ 0.35
Disodium phosphate _____ 0.10

Whipped topping (liquid)

Ingredient: Percent
Lactalbumin phosphate _____ 2.00
Hydrogenated vegetable oil _____ 28.00
Mono and diglycerides _____ 1.05
Stabilizer _____ 0.15
Flavor and color _____ ----
Water _____ Balance

EXAMPLE 3

The control formulation is typical of a conventional commercial whipped topping base. Test formulation is identical to the control formula except that the sodium caseinate ingredient has been replaced in toto by undenatured lactalbumin phosphate.

| Ingredients: | Control, percent | LAP percent |
|---|---|---|
| Sodium caseinate | 2.00 | |
| Lactalbumin phosphate | | 2.00 |
| Sugar | 8.00 | 8.00 |
| Vegetable shortening | 28.00 | 28.00 |
| Water | 60.35 | 60.35 |
| Stabilizer gum | 0.05 | 0.05 |
| Mono and diglycerides | 0.90 | 0.90 |
| Glyceryl lacto palmitate | 0.70 | 0.70 |
| Total | 100.00 | 100.00 |

The control formulation and test formulations I and II were prepared as follows:

The sodium caseinate, lactalbumin phosphate and lactalbumin phosphate/sodium caseinate mixture, respectively, were blended with the sugar and stabilizer. The water was placed in a steam jacketed kettle and the dry ingredients were added. The mixture was heated to a temperature of 120° F. The shortening and emulsifiers were melted together and added to the water suspension and the combined mixture was heated to a temperature of 160° F. with stirring. The hot solution was homogenized in a two-stage homogenizer at 1500/500 p.s.i. The homogenized mixture was cooled to a temperature of 35° to 40° F. an aged overnight at this temperature prior to evaluation.

The respective formulations were evaluated as follows:

Methods of evaluation (1) Whipping time: Pour 2 cups of liquid base in mixing bowl of N–50 Hobart Mixer. Using a wire whip at speed 3 whip until foam is stiff and pulls away from sides of bowl.

(2) Viscosity: Using the Brookfield Viscometer made HAF Spindle No. 1 at 10 r.p.m., measure viscosity of foam in a tall narrow beaker.

(3) Specific gravity: Determine foam specific gravity using standard specific gravity cups.

(4) Penetrometer: Using a Precision "Junior" Penetrometer with standard 50 gram aluminium cone, the penetration of the plunger into the foam in a souffle cup is measured under standard condition.

Evaluation (1) Control with sodium caseinate was normal in all respects. The foam had the following characteristics:

Whipping time—3+ minutes
Viscosity—60 cps.
Specific gravity—0.315 gm./cc.
Penetration—30.3 mm.
Foam consistency—firm (2) LAP samples D–8604 and D–9237 were evaluated in whipped toppings. The foams had the following characteristics:

| | D–8604 | D–9237 |
|---|---|---|
| Whipping time | 3 minutes | 3 minutes. |
| Viscosity | 20 cps | 14 cps. |
| Specific gravity | 0.300 gm./cc. | 0.350 gm./cc. |
| Penetration | 28.0 mm. | 31.5 mm. |
| Foam consistency | Firm and smooth | Firm. |

The difference in viscosities of the control and LAP samples were not organoleptically apparent. There was no apparent difference between control and LAP formulations.

Frozen desserts

Another area where non-butterfat dairy products have received public acceptance is in the area of frozen desserts such as the mellorines and "milk type" sherbets. In these compositions sodium caseinate is normally used to bind water, encapsulate fat droplets, and stabilize air blended into the mixture. It also serves to inhibit churning. Sodium caseinate is normally used in the formulations of such frozen desserts in amounts of from about 0.1 to about 5% by weight total. It has been found that the sodium caseinate in such formulations can be partially or totally replaced by lactalbumin phosphate to give equivalent or superior results.

Set forth below is a general formulation of such frozen desserts showing the percentage range of the ingredients used.

Frozen Desserts—Mellorines, Ice Milks, etc.

| Ingredients: | Percent (range) |
|---|---|
| Sodium caseinate (or LAP) | 0.5–5.0 |
| Sugar | 0–25.0 |
| Corn syrup solids | 0–25.0 |
| Vegetable shortening | 5.0–15.0 |
| Stabilizer gums and emulsifiers | 0.1–3.0 |
| Flavoring, color, salt | As needed |
| Water to bring to 100%. | |

Set forth below are typical representative formulations of frozen desserts utilizing lactalbumin phosphate. It will be noted that the "ice milk" formulation set forth below utilizes butterfat containing ingredients. Such compositions have employed sodium caseinate and can effectively employ lactalbumin phosphate.

Mellorine

| Ingredients: | Percent |
|---|---|
| Lactalbumin phosphate | 3.00 |
| Sugar | 12.00 |
| Corn syrup solids | 12.00 |
| Shortening | 10.00 |
| Salt | 0.10 |
| Stabilizer and emulsifier | 0.55 |
| Water | Balance |

"Ice Milk" (6% fat)

| Ingredients: | Percent |
|---|---|
| Cream 40% butterfat | 9.23 |
| Whole milk 3.5% butterfat | 65.81 |
| Lactalbumin phosphate | 2.00 |
| Sugar | 13.00 |
| Corn syrup solids | 4.40 |
| Stabilizer and emulsifiers | 0.45 |
| Non-fat dry milk | 1.50 |

EXAMPLE 4

In order to evaluate the use of lactalbumin phosphate as a replacement for sodium caseinate in frozen desserts, a control formulation was prepared containing sodium caseinate and a test formulation was prepared, identical to the control formulation except that the sodium caseinate was wholly replaced in an equal basis by lactalbumin phosphate. Color and flavoring was omitted from both formulations.

MELLORINE TYPE FROZEN DESSERT

| | Control,[1] percent | Test,[1] percent |
|---|---|---|
| Ingredients: | | |
| Sodium caseinate | 3.00 | |
| Lactalbumin phosphate (LAP) | | 3.00 |
| Sugar | 12.00 | 12.00 |
| Corn syrup solids 24 DE | 12.00 | 12.00 |
| Water | 62.35 | 62.35 |
| Shortening—hydrogenated vegetable oil | 10.00 | 10.00 |
| Salt | 0.10 | 0.10 |
| Stabilizer—carageenin [2] | 0.15 | 0.15 |
| Emulsifier—mono and diglyceride | 0.40 | 0.40 |
| Total | 100.00 | 100.00 |

[1] Color and flavor were not added.
[2] Other gums can be effectively used in this and other formulations throughout. Illustrative of such gums are guar, tragacanth and carboxy methyl cellulose.

Both the control formulation and the test formulation were prepared as follows: The sodium caseinate or lactalbumin phosphate, respectively, was blended with the sugar and stabilizer. The water was placed in a steam jacketed kettle and the dry ingredients were added with stirring. While stirring the corn syrup solids were added and stirred followed by the addition of the shortening, emulsifier, and salt. The mixture was heated in the kettle to a temperature of 160° F. The hot solution was homogenized in a two stage homogenizer at 2500/500 p.s.i. The homogenized liquid was cooled to a temperature of 35° to 40° F. and was aged overnight at this temperature. The aged solution was frozen by storage in a conventional commercial ice cream freezer at a temperature of —10° F. for a period of about 12 hours to harden.

Evaluation (1) Control sodium caseinate base was normal for this type of product. The following characteristics were noted:

Viscosity at 50° F.—45 cps.
Freezing Time—15+ minutes
Specific gravity after freezing—0.62 gm./cc.
Stability at room temperature for 15 minutes—good.

(2) Test sample was compared with the sodium caseinate control.

Viscosity at 50° F.—70 cps.
Freezing time—10 minutes
Specific gravity after freezing—0.64 gm./cc.
Stability at room temperature for 15 minutes—excellent.

The LAP sample required less time to reach the "finished" soft serve consistency. It was also observed that the mellorine product prepared with the LAP retained its "body" longer at room temperature than the product prepared with sodium caseinate.

Other examples of non-butterfat dairy products which employ sodium caseinate and which can effectively employ undenatured lactalbumin phosphate as a partial or total replacement are set forth below.

Imitation sour cream

A general formulation for imitation sour cream is as follows:

Imitation sour creams

| Ingredients: | Percent (range) |
|---|---|
| Sodium caseinate (or LAP) | 0.5–5.0 |
| Vegetable shortening | 10.0–15.0 |
| Sugar and/or corn syrup solids | 5.0–15.0 |
| Stabilizers and emulsifiers | 0.1–2.0 |
| Flavor and color | As needed |
| Water to bring to 100%. | |

This formulation is prepared by the following procedure:

Procedure

Heat water to 90–110° F.
Add milk solids and stabilizer. Mix to dissolve.
Add shortening and emulsifier.
Pasteurize with stirring at 165° F. for 30 minutes.
Homogenize twice at 2500 p.s.i. (one stage only), keeping temperature above 160° F. during two homogenization steps.
Cool mix to 72° F. and add the culture to be used (3% buttermilk or a commercial starter following manufacturer's directions).
Maintain at 72° F. for ripening until acidity reaches 0.8% (18–20 hours). Cool to 35°–40° F.

A representative formulation for imitation sour cream utilizing lactalbumin phosphate is as follows.

Imitation sour cream

| Ingredients: | Percent |
| --- | --- |
| Lactalbumin phosphate | 3.00 |
| Vegetable shortening | 15.00 |
| Corn syrup solids | 5.00 |
| Mono and diglycerides | 0.50 |
| Stabilizer | 0.22 |
| Water | 76.23 |

Imitation cream cheese

Sodium caseinate is an effective ingredient in the formulation of imitation cream cheese. Lactalbumin phosphate is an effective replacement for the sodium caseinate in whole or part.

A typical general and specific formulation for imitation cream cheese is set forth below:

Imitation cream cheese

| Ingredients: | Percent (range) |
| --- | --- |
| Sodium caseinate (or LAP) | 0.5–5.0 |
| Sugar or corn syrup solids | 5.0–15.0 |
| Vegetable shortening | 15.0–40.0 |
| Stabilizer gums and emulsifiers | 0.1–5.0 |
| Flavorings, color | As needed |
| Water to bring to 100%. | |

Imitation cream cheese

| Ingredients: | Percent |
| --- | --- |
| LAP | 2.00 |
| Corn syrup solids | 7.00 |
| Salt | 0.15 |
| Stabilizer and emulsifier | 2.55 |
| Vegetable shortening | 25.00 |
| Flavored acid | 0.85 |
| Water | 62.45 |

Lactalbumin phosphate can similarly effectively replace sodium caseinate in baby formulas, cream pie bases, cocoa drinks, "Instant Breakfasts," and process cheese as well as in nutrient application for soup and baby foods.

The vegetable shortening used in the formulations above and throughout the specification are hydrogenated vegetable oils. Such shortening materials are made from many oils, some being mixtures of such oils. All of which are well known in the art. Exemplary of such oils are soy bean oil, corn oil, coconut oil, peanut oil, safflower seed oil and the like. It is, of course, understood that animal fats such as those which are conventionally used as shortenings such as for example, lard, can be used herein.

Emulsifying agents used in the formulations of this invention are preferably the mono and diglycerides of the fat acids usually in admixture. However, any other food grade emulsifiers can be used.

Similarly, gums other than carageenin such as tragacanth, guar, carboxymethyl cellulose and the like can be used as stabilizers.

Corn syrup solids can be replaced with any other dextrose material which provides equivalent results.

Natural and artificial sweeteners such as honey, and the cyclamates can be used in place of sugar where desired.

Similarly dipotassium phosphate is set forth herein as a buffer material. Other equivalent food grade buffer materials can be used, such as sodium phosphate and the like.

In any of the compositions of this invention such flavorings as are normally used in the art can be similarly used herein.

Clearly, many variations and modifications are within the scope and spirit of this invention and therefore no unnecessary limitations should be implied from the foregoing specification.

While obvious from its usage throughout this specification, it should nonetheless be noted that the term LAP has been used as an abbreviation for undenatured lactalbumin phosphate as defined herein

What is claimed is:

1. In a method for preparing a non-butterfat containing dairy composition normally containing sodium caseinate the improvement which comprises replacing from about 0.1% to 100% of the sodium caseinate requirement of said composition with undenaturated lactalbumin phosphate, said replacement being in an amount sufficient to provide the functional equivalence of said replaced sodium caseinate.

2. The method as recited in claim 1 wherein said dairy composition normally contains from about 0.1 to about 20% by weight sodium caseinate based on the total weight of said non-butterfat containing dairy compostion.

3. The method as recited in claim 1 wherein said dairy composition normally contains from about 0.5 to about 5.0% by weight sodium caseinate based on the total weight of said non-butterfat containing dairy compositions.

4. The method as recited in claim 1 wherein the ingredients of said composition include shortening and water.

5. In a method for preparing a non-butterfat containing dairy composition normally containing sodium caseinate the improvement which comprises replacing from about 0.1% to about 100% of the sodium caseinate requirement of said composition with an admixture consisting of sodium caseinate and undenatured lactalbumin phosphate, said replacement being in an amount sufficient to provide the functional equivalence of said replaced sodium caseinate.

6. In a method for preparing a liquid coffee whitener composition normally containing 0.5 to 5% by weight sodium caseinate and normally comprising in addition thereto from about 7.5 to about 15% by weight corn syrup solids, from about 7.5 to about 15% by weight shortening, from about 0.5 to about 1.5% by weight dipotassium phosphate buffer, from about 0 to about 5% by weight stabilizer gum, from about 0 to about 0.5% by weight food emulsifier and sufficient water to bring the total composition to about 100%, the improvement which comprises replacing from about 0.1 to 100% of the sodium caseinate requirement of said composition with undenatured lactalbumin phosphate, said replacement being in an amount sufficient to provide the functional equivalence of said replaced sodium caseinate.

7. In a method for preparing a dry coffee whitener composition normally containing 5.0 to about 10% by weight sodium caseinate and normally comprising in addition thereto from about 35% to about 50% by weight corn syrup solids, from about 0 to about 5% by weight food emulsifier, and from about 0.5% to about 3% by weight dipotassium phosphate buffer the improvement which comprises replacing from about 0.1 to 100% of the sodium caseinate requirement of said composition with undenatured lactalbumin phosphate, said replacement being in an amount sufficient to provide the functional equivalence of said replaced sodium caseinate.

8. In a method for preparing a whipped topping based composition normally containing 0.5 to about 5% by weight sodium caseinate and normally comprising in addition thereto from about 20 to about 40% by weight shortening, from about 0.2 to about 5% by weight stabilizer gum, from about 2 to about 5% by weight food emulsifier, from about 0 to about 15% by weight corn syrup solids, from about 0 to about 15% sweetener, with sufficient water to bring the composition to about 100%, the improvement which comprises replacing from about 0.1 to 100% of the sodium caseinate requirement of said composition with undenatured lactalbumin phosphate, said replacement being in an amount sufficient to provide the functional equivalence of said replaced sodium caseinate.

9. In a method for preparing a dry whipped topping composition normally containing 3 to about 10% by weight sodium caseinate and normally comprising in addition thereto from about 50% to about 70% by weight shortening, from about 0 to about 20% by weight sweetener, from about 0 to about 25% corn syrup solids, from about 0 to about 15% combined stabilizers, emulsifiers, buffers, flavoring and color, the improvement which comprises replacing from about 0.1 to 100% of the sodium caseinate requirement of said composition with undenatured lactalbumin phosphate, said replacement being in an amount sufficient to provide the functional equivalence of said replaced sodium caseinate.

10. In a method for preparing a frozen dessert composition normally containing from 0.5 to about 5% sodium caseinate and normally comprising in addition thereto from about 0 to about 25% by weight sweetener, from about 0 to about 25% by weight corn syrup solids, from about 5 to about 15% by weight shortening, from about 0.1 to about 3% by weight combined stabilizer gums and emulsifiers, with sufficient water to bring the composition to about 100%, the improvement which comprises replacing from about 0.1% to 100% of the sodium caseinate requirement of said composition with undenatured lactalbumin phosphate, said replacement being in an amount sufficient to provide the functional equivalence of said replaced sodium caseinate.

11. In a method for preparing an imitation sour cream composition normally containing from 0.5 to about 5% sodium caseinate and normally comprising in addition thereto from about 0 to about 25% by weight sweetener, from about 0 to about 25% corn syrup solids, from about 5 to about 15% by weight shortening, from about 0.1 to about 3% by weight combined stabilizer gums and emulsifiers, with sufficient water to bring the composition to about 100%, the improvement which comprises replacing from about 0.1 to 100% of the sodium caseinate requirement of said composition with undenatured lactalbumin phosphate, said replacement being in an amount sufficient to provide the functional equivalence of said replaced sodium caseinate.

12. In a method for preparing an imitation cream cheese composition normally containing from about 0.5 to about 5% by weight sodium caseinate and normally comprising in addition thereto from about 5.0 to about 15% by weight combined sugar and corn syrup solids, from about 15 to about 40% by weight shortening, from about 0.1 to about 5% by weight combined stabilizer gums and emulsifiers with sufficient amount of water to bring the composition to about 100%, the improvement which comprises replacing from about 0.1 to about 100% of the sodium caseinate requirement of said composition with undenatured lactalbumin phosphate, said replacement being in an amount sufficient to provide the functional equivalence of said replaced sodium caseinate.

References Cited
UNITED STATES PATENTS

| | | | |
|---|---|---|---|
| 3,269,843 | 8/1966 | McKee et al. | 99—94 |
| 3,356,507 | 12/1967 | Wingerd | 99—139 |
| 3,359,116 | 12/1967 | Little | 99—116X |
| 3,431,173 | 3/1969 | Lorant | 99—139 |
| 3,458,319 | 7/1969 | Block et al. | 99—63X |

LIONEL M. SHAPIRO, Primary Examiner

D. M. NAFF, Assistant Examiner

U.S. Cl. X.R.

99—57

PO-1050
(5/69)

UNITED STATES PATENT OFFICE
CERTIFICATE OF CORRECTION

Patent No. 3,563,761      Dated    February 16, 19

Inventor(X) R. H. Ellinger

It is certified that error appears in the above-identified patent and that said Letters Patent are hereby corrected as shown below:

Table I, Column 3 - "Miilk Lactalbumin" should be -- Milk Lactalbumin --.

Column 6, line 52, after the word "homogenized" insert the word --mixture--.

Column 10, line 51, under column Percent (range), delete "10.0 - 15.0" and insert in lieu thereof --10.0 - 25.0--

Column 12, line 13 (Claim 2), delete the word "compostion and insert in lieu thereof the word --compositi Signed and sealed this 20th day of July 1971.

(SEAL)
Attest:

EDWARD M. FLETCHER, JR.
Attesting Officer

WILLIAM E. SCHUYLER, JR.
Commissioner of Patents